Figures 1, 2, 3:
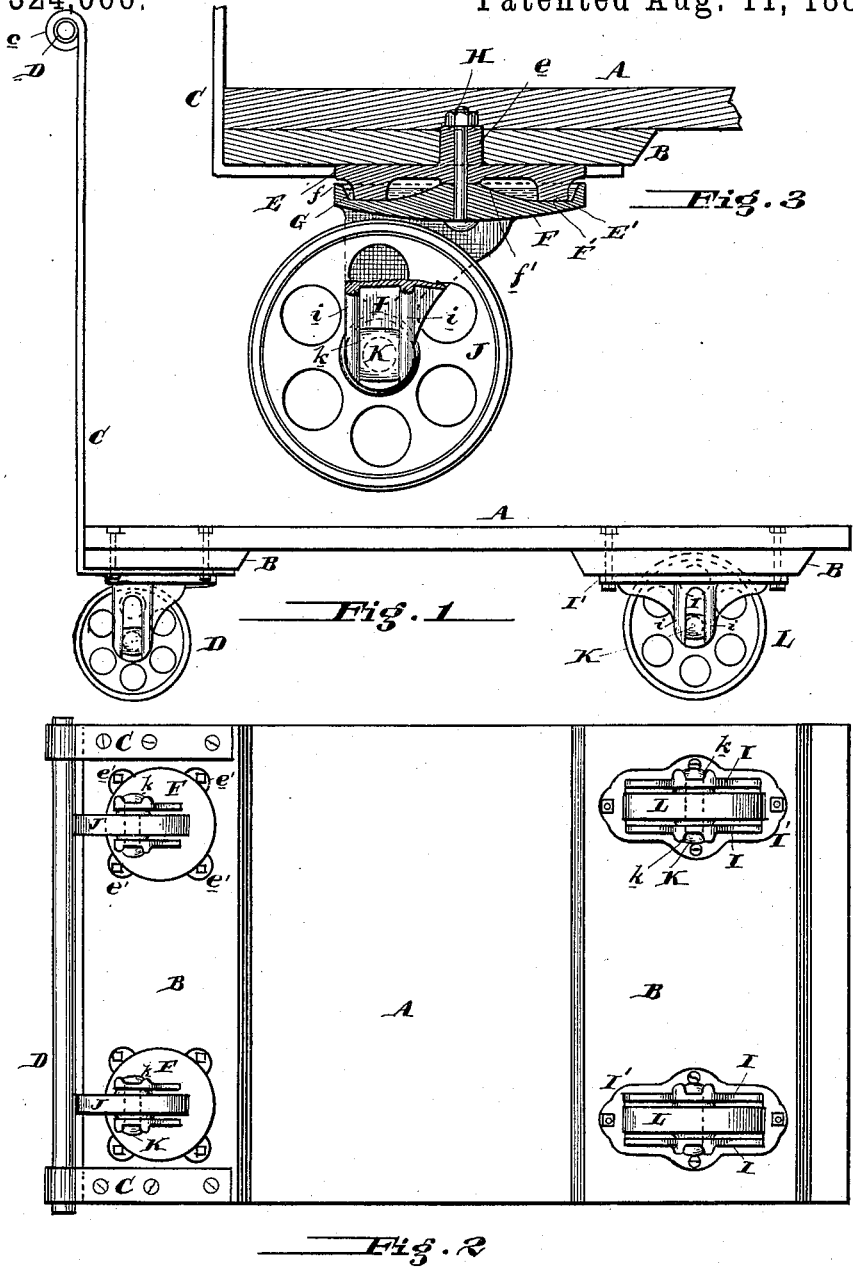

(No Model.)

G. F. ARMSTRONG.
WAREHOUSE TRUCK.

No. 324,066. Patented Aug. 11, 1885.

Attest
Homer A. Herr.
James Barber

Inventor
George F. Armstrong
By his atty.

UNITED STATES PATENT OFFICE.

GEORGE F. ARMSTRONG, OF PHILADELPHIA, PENNSYLVANIA.

WAREHOUSE-TRUCK.

SPECIFICATION forming part of Letters Patent No. 324,066, dated August 11, 1885.

Application filed December 19, 1884. (No model.)

*To all whom it may concern:*

Be it known that I, GEORGE F. ARMSTRONG, of the city and county of Philadelphia, and State of Pennsylvania, have invented a new and useful Improvement in Warehouse-Trucks, of which the following is a specification.

My invention has reference to the construction of caster-wheels especially designed for warehouse-trucks.

The object of this invention is to greatly improve the working of truck-supporting wheels or casters, and to so construct the same that they shall be most durable, and at the same time work with the least practical amount of friction.

In the drawings, Figure 1 is a side elevation of a truck provided with my improved caster-wheels. Fig. 2 is an inverted plan view of same; and Fig. 3 is a sectional elevation of same.

A is the main platform of the truck, and may be made in any suitable manner, preferably, however, of a single flat board. B B are the cross-pieces bolted to the said floor at either end of the same by the bolts which secure the supporting wheels or casters to the truck, or otherwise, if desired. The wheels L at one end are supported loosely upon axle-pins K, which are inserted through bearings I I, cast solid with the base-plate I', and having the strengthening-ribs $i$, and between which the ends of said pins K are riveted so as to prevent their rotating. These plates I' are bolted to one of the cross-pieces B, as shown, the bolts of which may pass through both the said cross-pieces B B, and the floor A, as shown, securing all three parts together. By this construction it is self-evident that the bearing-plates I may be made very thin or narrow, as it is not necessary that the axle-pin rotate therein, as I prefer to make the bearing of the wheel wide, and adapted to revolve loosely upon the said axle-pin, being kept from lateral movement by the said plates I. The supporting-wheels at the other end of the truck are made in the form of casters. To the cross-piece B at this end is secured a base-plate, E, by means of bolts $e'$, which preferably pass through the cross-piece B and the platform A. This base-plate E is provided with a hub, $e$, and the annular bearing E'. Pivoted to the under face of the said base-plate is a cup-piece, F, having an annular flange, $f$, about its periphery extending upward, an annular bearing-surface, F', upon which the bearing E' works, and a raised central portion, $f'$, to cause the oil which is contained in said cup-bearing to flow down to the surfaces of contact E' and F'.

H is a bolt which passes through the hub $e$ of plate E and the cup-piece F, and acts as a pivot upon which the latter revolves upon the former, and the hub $e$ being let into the cross-piece B, and, if desired, the platform A, causes great rigidity and strength. The cup-piece F is provided with two bearing-plates, I, having small ribs $i$, similar to those described when referring to the supporting-wheels L, and between which the caster-wheels J are supported, being journaled therein by a pin, K, riveted between the ribs $i$, as hereinbefore explained, and upon which the caster-roller I loosely revolves, (the said axle-pin being substantially under the annular bearing E',) so as to act as a caster and trail after the pin H, according as to the direction in which the truck is moved.

As shown, there are but two caster-wheels, but if desired it is self-evident that there may be but a single one.

C are two irons secured to the caster end of the truck, and terminate in their upper ends in loops $c$, through which the handle D, formed of iron tubing, is passed.

By this construction of caster-wheels it is not required that the parts be lubricated often, as the cup-shaped bearing will contain sufficient lubricant to last for a great length of time, and from the construction shown it is evident that the last drop of lubricant is consumed. By forming the axle-pin for the rollers rigid much less wear results, and a less depth in the holes for the reception of said pin is required; but while I prefer the construction shown I do not limit myself to the exact details thereof, as they may be modified in various ways without departing from my invention.

Having now described my invention, what I claim as new, and desire to secure by Letters Patent, is—

1. A caster for a truck, which consists of a base-plate having an annular bearing-face, in combination with a cup-shaped oil-holding plate secured to said base-plate by a pivot-joint at its center, and having an axle-pin located to one side of its center, and a loose wheel journaled upon said axle-pin, substantially as and for the purpose specified.

2. A caster for a truck, which consists of a base-plate having an annular bearing-face, in combination with a cup-shaped oil-holding plate secured to said base-plate by a pivot-joint at its center, and having an axle-pin located to one side of its center, the central part of said oil holding plate being raised so as to cause the oil to flow down to the bearing-faces, and a loose wheel journaled upon said axle-pin, substantially as and for the purpose specified.

3. A caster for a truck, which consists of a base-plate having an annular bearing-face, in combination with a cup-shaped oil-holding plate secured to said base-plate by a pivot-joint at its center and secured rigidly therein, and a loose wheel journaled upon said axle-pin, substantially as and for the purpose specified.

4. The combination of plate E, having annular bearing-face E', with cup-shaped oil-plate F, having bearing-face F', and raised edges $f$, and provided with an axle or journal under or nearly under the said bearing-face E', a loose wheel carried by said axle, and a pin, H, to pivot the plates E and F together, substantially as and for the purpose specified.

5. The combination of plate E, having annular bearing-face E', with cup-shaped oil-plate F, having bearing-face F', and raised edges $f$ and center $f'$, provided with an axle or journal under or nearly under the said bearing-face E', a loose wheel carried by said axle, and a pin, H, to pivot the plates E and F together, substantially as and for the purpose specified.

6. The side plates, I, having strengthening-ribs $i$, in combination with pin or axle K, made rigid therein by having its ends riveted between the said ribs, and a loose wheel having a wide bearing working on said axle-pin and held from lateral motion by the said plates, substantially as and for the purpose specified.

In testimony of which invention I hereunto set my hand.

GEORGE F. ARMSTRONG.

Witnesses:
R. M. HUNTER,
FRANCIS S. BROWN.